United States Patent
Edquist (10) Patent No.: US 12,442,689 B2
(45) Date of Patent: Oct. 14, 2025

(54) SENSOR COMBINATION FOR ULTRAVIOLET LIGHT SYSTEM OCCUPANCY DETECTION

(71) Applicant: B/E Aerospace, Inc., Winston Salem, NC (US)

(72) Inventor: John D Edquist, Milwaukee, WI (US)

(73) Assignee: B/E AEROSPACE, INC., Winston Salem, NC (US)

(*) Notice: Subject to any disclaimer, the term of this patent is extended or adjusted under 35 U.S.C. 154(b) by 597 days.

(21) Appl. No.: 17/860,958

(22) Filed: Jul. 8, 2022

(65) Prior Publication Data

US 2024/0011837 A1    Jan. 11, 2024

(51) Int. Cl.
| | |
|---|---|
| *G01J 5/00* | (2022.01) |
| *A61L 2/10* | (2006.01) |
| *G06V 40/10* | (2022.01) |
| *G08B 21/22* | (2006.01) |
| *H05B 47/115* | (2020.01) |

(52) U.S. Cl.
CPC .......... *G01J 5/0025* (2013.01); *G06V 40/103* (2022.01); *G08B 21/22* (2013.01); *A61L 2/10* (2013.01); *G06V 2201/07* (2022.01); *H05B 47/115* (2020.01)

(58) Field of Classification Search
CPC .......... A61L 2/10; A61L 2/24; A61L 2202/14; A61L 2202/16; A61L 2202/25; G06V 40/103; G06V 2201/07; G01J 5/0025; G08B 21/22; H05B 47/115; E03D 9/002; B60R 15/04; B64D 11/02
See application file for complete search history.

(56) References Cited

U.S. PATENT DOCUMENTS

| | | | |
|---|---|---|---|
| 9,524,480 B2 | 12/2016 | Christensen | |
| 9,795,701 B2 | 10/2017 | Dayton | |
| 10,906,647 B2 | 2/2021 | Alvarez | |
| 12,225,647 B2* | 2/2025 | Slivka | H05B 47/196 |
| 2019/0022263 A1 | 1/2019 | Quilici | |
| 2021/0070587 A1* | 3/2021 | Blaiotta | B66B 13/22 |
| 2021/0113724 A1 | 4/2021 | Ufkes et al. | |
| 2022/0008575 A1 | 1/2022 | Sood et al. | |

(Continued)

OTHER PUBLICATIONS

European Patent Office, European Search Report dated Nov. 7, 2023 in Application No. 23184178.4.

*Primary Examiner* — Randy W Gibson
(74) *Attorney, Agent, or Firm* — SNELL & WILMER L.L.P.

(57) ABSTRACT

A method of determining occupancy of an area is disclosed herein. The method includes receiving a first signal from an occupancy sensor, the first signal indicating a distance to a surface and an infrared signature of the area, determining a first infrared signature of the area based on the first signal from the occupancy sensor, receiving a second signal from the occupancy sensor, the second signal indicating the distance to a surface and the infrared signature of the area, determining a second infrared signature of the area based on the second signal, the second infrared signature being different than the first infrared signature, determining that the area is occupied based at least on part on the second infrared signature being different than the first infrared signature, and setting a status of the area to occupied in response to the second infrared signature being different than the first infrared signature.

7 Claims, 5 Drawing Sheets

(56) References Cited

U.S. PATENT DOCUMENTS

| | | | |
|---|---|---|---|
| 2023/0100580 A1* | 3/2023 | Edquist | A61L 2/10 |
| | | | 422/3 |
| 2023/0398244 A1* | 12/2023 | Edquist | A61L 2/24 |
| 2023/0399834 A1* | 12/2023 | Del Pinto | A61L 9/015 |
| 2024/0207475 A1* | 6/2024 | Kaler | A61L 9/20 |
| 2024/0300649 A1* | 9/2024 | Scoley | B60R 15/04 |

* cited by examiner

SENSOR COMBINATION FOR ULTRAVIOLET LIGHT SYSTEM OCCUPANCY DETECTION

FIELD

The present disclosure generally relates occupancy detection in lavatories, and more specifically, to occupancy detection for ultraviolet lighting application in lavatories.

BACKGROUND

Ultraviolet (UV) lighting technologies may be used to perform germicidal functions on surfaces in various locations, including in small spaces such as aircraft lavatories. An occupant inside the aircraft lavatory may prevent emitted UV energy from reaching the target surface thereby negating the germicidal benefits of the UV lighting. Furthermore, it is not desirable to expose a lavatory occupant to unnecessary UV lighting as there is little to no benefit to the occupant. Current occupancy detection systems and methods, while suitable for turning lighting on and off, do not provide reliably accurate occupancy detection sufficient for use with UV light disinfection systems.

SUMMARY

A method of determining occupancy of an area is disclosed herein. The method includes receiving, by a processor, a first signal from an occupancy sensor, the first signal indicating a distance to a surface and an infrared signature of the area, determining, by the processor, a first infrared signature of the area based on the first signal from the occupancy sensor, receiving, by the processor, a second signal from the occupancy sensor, the second signal indicating the distance to a surface and the infrared signature of the area, determining, by the processor, a second infrared signature of the area based on the second signal, the second infrared signature being different than the first infrared signature, determining, by the processor, that the area is occupied based at least on part on the second infrared signature being different than the first infrared signature, and setting, by the processor, a status of the area to occupied in response to the second infrared signature being different than the first infrared signature.

In various embodiments, the second infrared signature exceeds an occupancy threshold. In various embodiments, the distance exceeds a distance threshold. In various embodiments, the method further includes determining, by the processor, a first distance to the surface based on the first value, determining, by the processor, a second distance to the surface based on the second signal, wherein the second distance is different than the first distance, and determining, by the processor, that the area is occupied based at least in part on the second distance being different than the first distance.

In various embodiments, the first signal includes a first value indicating the distance to the surface and a second value indicating the infrared signature of the area. In various embodiments, the first value is from a proximity sensor and the second value is from motion sensor. In various embodiments, the method further includes loading, by the processor, a baseline ambient light level from a memory, determining, by the processor, a first ambient light level based on the second signal, and determining, by the processor, that the first ambient light level is different than the baseline ambient light level.

In various embodiments, the method further includes establishing, by the processor, a baseline distance to the surface and establishing, by the processor, a baseline infrared signature of the area. In various embodiments, the method further includes transmitting, by the processor, the first signal to an external controller and receiving, by the processor, a third signal from the external controller, the third signal indicating the occupancy status of the area.

Also disclose herein is a system for using an ultraviolet (UV) light including a UV light source, an occupancy sensor, and a UV light source driver. The UV light source driver includes a processor and a memory coupled to the processor, the memory comprising instructions that, when executed by the processor cause the processor to receive a first signal from the occupancy sensor, the first signal indicating a distance to a surface and an infrared signature of an area around occupancy sensor, determine a first infrared signature of the area based on the first signal from the occupancy sensor, receive a second signal from the occupancy sensor, the second signal indicating the distance to a surface and the infrared signature of the area, determine a second infrared signature of the area based on the second signal, the second infrared signature being different than the first infrared signature, determine that the area is occupied based at least on part on the second infrared signature being different than the first infrared signature, and set a status of the area to occupied in response to the second infrared signature being different than the first infrared signature.

In various embodiments, the instructions, when executed by the processor, further cause the processor to determine a first distance to the surface based on the first value, determine a second distance to the surface based on the second signal, wherein the second distance is different than the first distance, and determine that the area is occupied based at least in part on the second distance being different than the first distance.

In various embodiments, the occupancy sensor includes a motion sensor and a proximity sensor. In various embodiments, the proximity sensor further includes an ambient light sensor. In various embodiments, the first signal includes a first value indicating the distance to the surface and a second value indicating the infrared signature of the area. In various embodiments, the instructions, when executed by the processor, further cause the processor to load a baseline ambient light level from the memory, determine a first ambient light level based on the second signal, and determine that the first ambient light level is different than the baseline ambient light level. In various embodiments, the instructions, when executed by the processor, further cause the processor to establish a baseline distance to the surface and establish a baseline infrared signature of the area.

Also disclosed herein is a system for determining occupancy of an area including a proximity sensor, a motion sensor and a controller. The controller includes a processor and a memory coupled to the processor, the memory comprising instructions that, when executed by the processor, cause the processor to read a first value from the proximity sensor, read a second value from the motion sensor, determine a first distance to a surface based on the first value, determine a first infrared signature of the area based on the second value, read a third value from the proximity sensor, read a fourth value from the motion sensor, and determine that the area is occupied based at least in part on the third value and the fourth value.

In various embodiments, the instructions, when executed by the processor, further cause the processor to determine a second distance to the surface based on the third value, determine that the second distance is different than the first distance, and determine that the area is occupied based at least in part on the determination that the second distance is different than the first distance. In various embodiments, the instructions, when executed by the processor, further cause the processor to determine a second infrared signature of the area based on the fourth value, determine that the second infrared signature is different than the first infrared signature, and determine that the area is occupied based at least in part on the determination that the second infrared signature is different than the first infrared signature. In various embodiments, the proximity sensor further comprises an ambient light sensor.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a system and methods for reliably determining the occupancy status of an area, such as an aircraft lavatory, for example. In various embodiments, an occupancy sensor may be paired with an ultraviolet (UV) light emitting module used for disinfecting surfaces within the area. In various embodiments, the occupancy sensor may include more than one sensor and more than one sensor type. For example, a motion detector may be combined with a proximity sensor to provide improved reliability in detecting occupancy of the area. In various embodiments, the motion detector may be a passive infrared (PIR) sensor. In various embodiments, the proximity sensor may be an infrared (IR) proximity sensor. Each sensor type (e.g., PIR sensor, IR sensor) has different capabilities such that when working in tandem, the combined sensors provide improved accuracy and sensitivity over a single type of sensor.

For example, a PIR sensor monitors infrared energy received and identifies changes in the received infrared energy. In various embodiments, a PIR sensor may be customized based on a lens and/or sensor combination to optimize the field of view of the PIR sensor. In various embodiments, a PIR sensor can reliably detect normal movements such as a door opening, a passenger entering a lavatory, among others. Typically, a PIR sensor does not detect immobile objects reliably. A PIR sensor, in various embodiments, may be susceptible to infrared energy noise which reduces the reliability of the sensor. Furthermore, in various embodiments, a PIR sensor has a startup period during which the PIR sensor sets a baseline infrared energy.

As another example, an IR sensor, or proximity sensor, uses an IR LED and IR sensor to detect the proximity to the sensor. In various embodiments, an IR sensor may include an ambient visible light sensor. Typically, occupancy may be determined using an IR sensor by measuring a distance between the sensor and an object (e.g., the floor) for change. In various embodiments, an IR sensor may detect immobile objects by comparing a distance measurement to a known distance. In various embodiments, an IR sensor may infer events and/or gestures through learned inputs. Generally, IR sensors have a limited field of view with no secondary lens options. In various embodiments, as the range of the IR sensor increases, the field of view decreases.

Combining the two types of sensors, PIR and IR, improves the overall reliability of occupancy detection with each sensor compensating for the other sensor. For example, the wide field of view of the PIR sensor augments the narrow field of view of the IR sensor. This combination provides a higher accuracy in determining occupancy of an area (e.g., the lavatory). In various embodiments, a single device, such as a UV light module, may include both sensors to determine the occupancy status of the lavatory. Additionally, the use of two sensors provides redundancy to for occupancy sensor since either sensor (e.g., the PIR sensor and the IR sensor) will work by itself.

Figure 1:
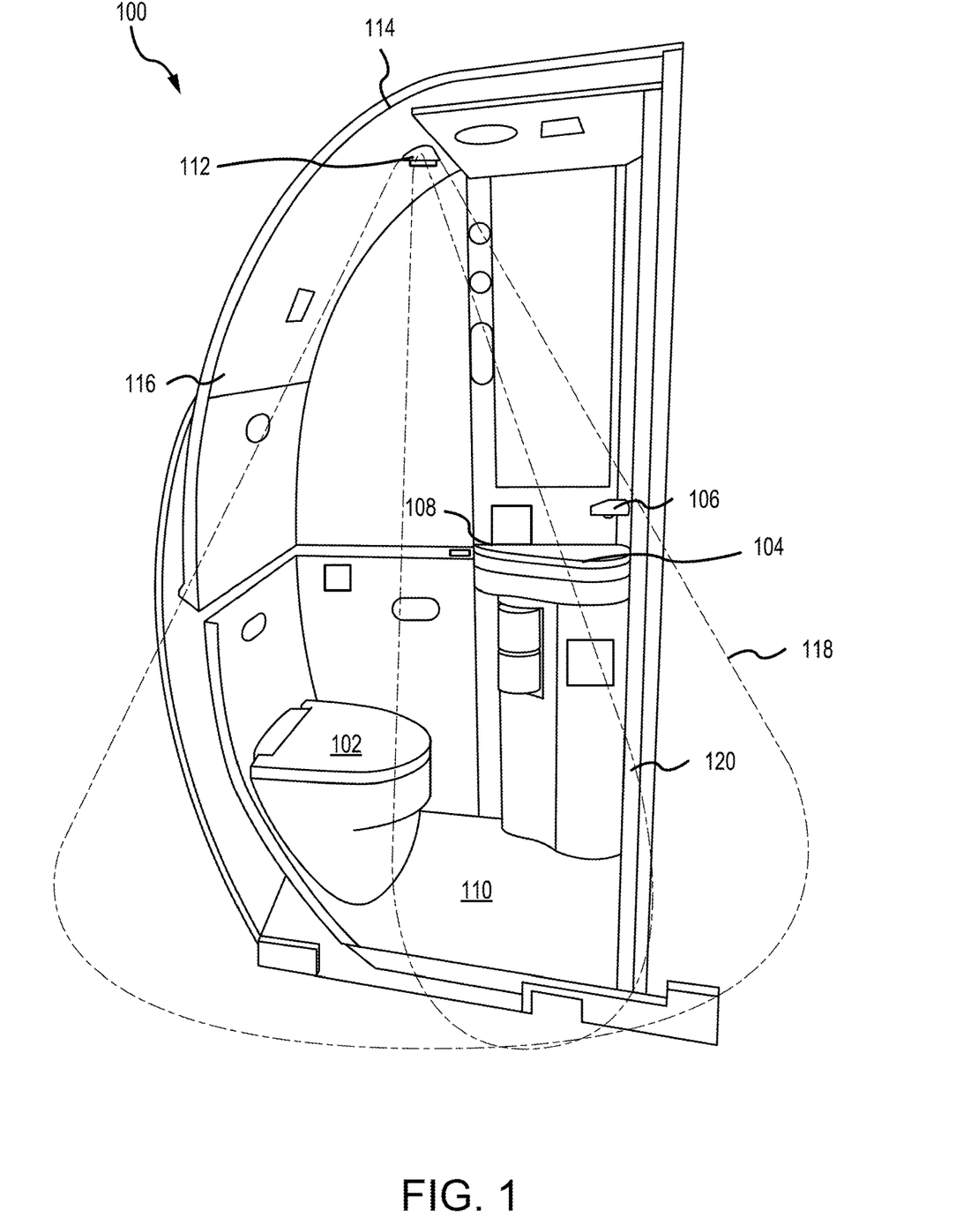
FIG. 1 illustrates a lavatory including an ultraviolet lighting module, in accordance with various embodiments.

Referring now to FIG. 1, in accordance with various embodiments, an aircraft lavatory 100 is illustrated. Aircraft lavatory 100 includes a toilet 102, a sink 104, a faucet 106, a counter 108, a floor 110, and an ultraviolet (UV) light module 112, also referred to as UV module 112. UV module 112 may be placed in a ceiling 114 of aircraft lavatory 100 or a wall 116 of aircraft lavatory 100. As illustrated, UV module 112 is placed in the ceiling 114 of aircraft lavatory 100 and is able to emit UV energy onto toilet 102, sink 104, faucet 106, counter 108, and floor 110, among other fixtures in aircraft lavatory 100.

As can be seen in FIG. 1, each of floor 110, toilet 102, counter 108, and ceiling 114 are at different distances from UV module 112. For example, floor 110 may be about 72 inches (182.9 cm) from UV module 112, toilet 102 may be about 48 inches (121.9 cm) from UV module 112, counter 108 may be about 36 inches (91.5 cm) from UV module 112, and ceiling 114 may be flush with, or about 0 inches (0 cm) from, UV module 112. The head of a passenger entering aircraft lavatory 100 may be between about 0 inches (0 cm) and about 36 inches (91.5 cm) from UV module 112. Each of these distances are exemplary and for discussion purposes of this disclosure. It should be appreciated that the distances may vary depending on the type of aircraft, the type of lavatory, the fixtures within the lavatory, and the height of the passenger, among other variables.

Further illustrated in FIG. 1 are a motion sensor coverage area 118 and a proximity sensor coverage area 120. Motion sensor coverage area 118 indicates the area in which a motion sensor may detect occupancy within aircraft lavatory 100. In various embodiments, motion sensor coverage area 118 may cover most, if not all, of aircraft lavatory 100. Proximity sensor coverage area 120 indicates the area in which a proximity sensor may detect occupancy within aircraft lavatory 100.

Figure 2A:
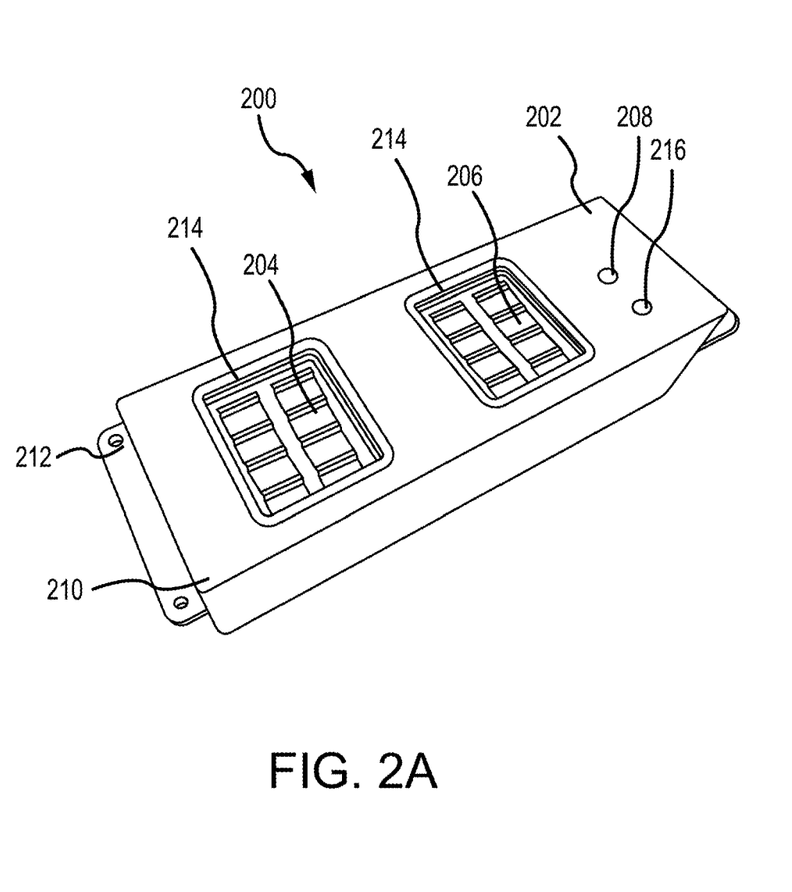
FIGS. 2A, 2B, and 2C illustrate an ultraviolet lighting module and sensors, in accordance with various embodiments.
Figure 2B:
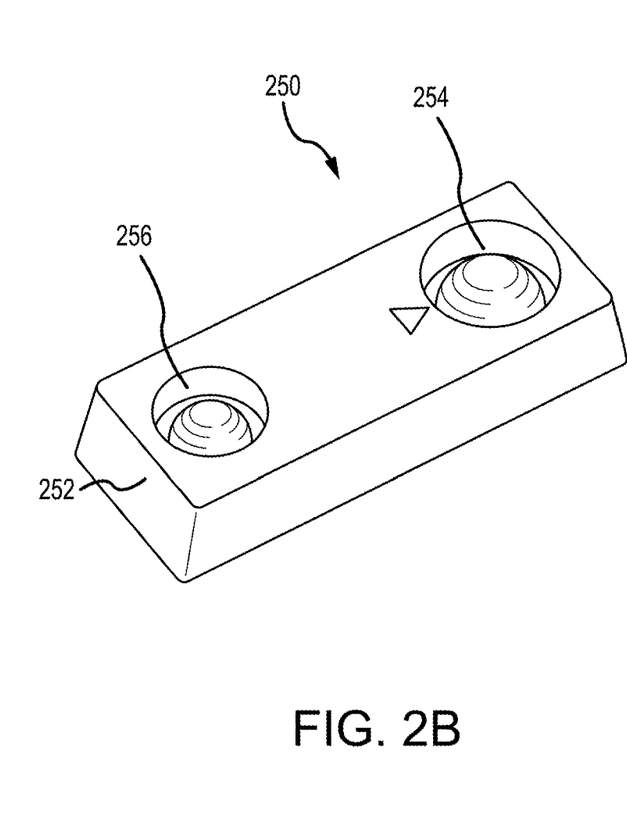
Figure 2C:
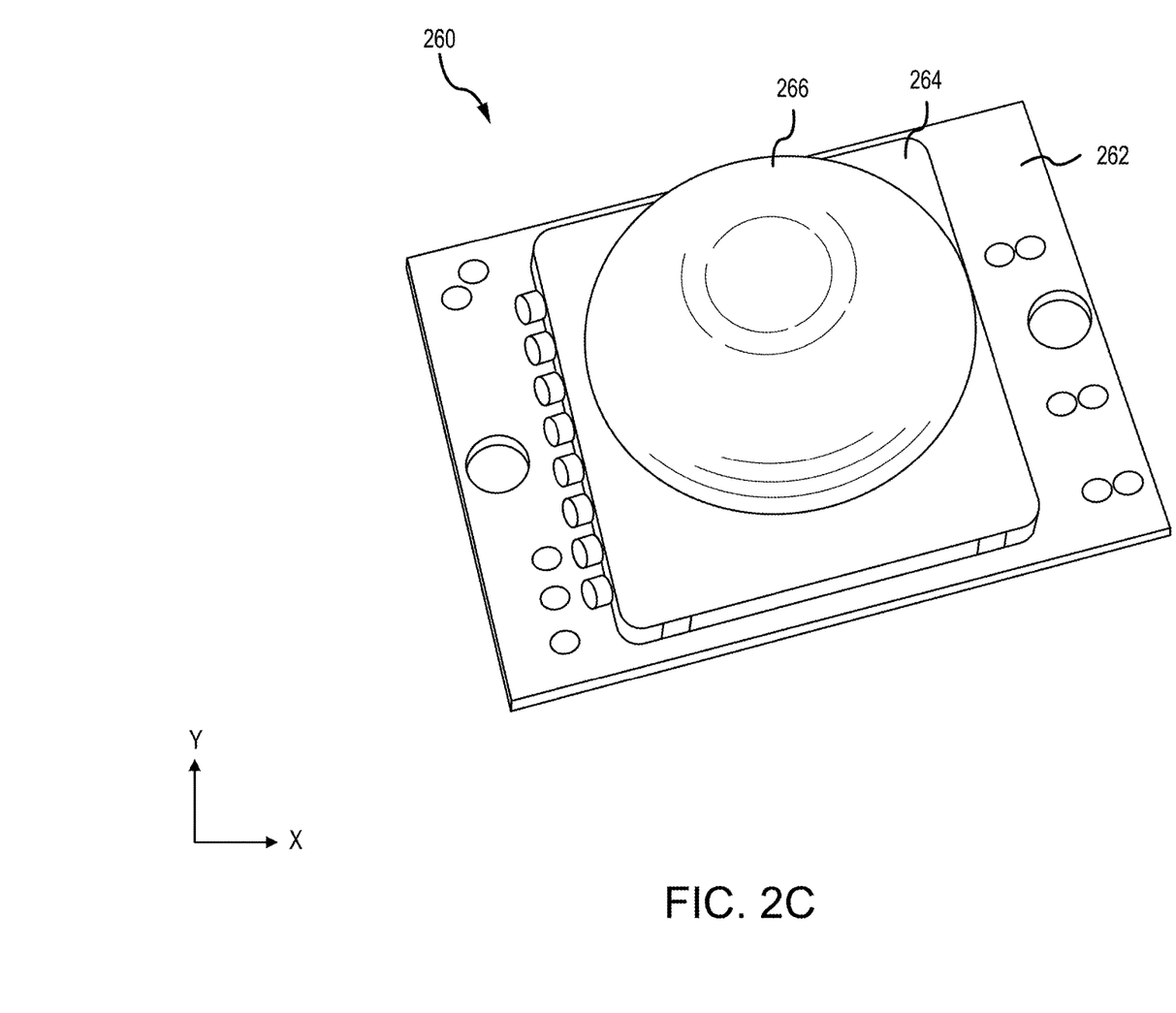

Referring now to FIGS. 2A-2C, in accordance with various embodiments, a UV module 200 including a proximity sensor 250 and a motion sensor 260 are illustrated. UV module 200 may be an example of UV module 112 described above with respect to FIG. 1. In various embodiments, proximity sensor 250 may be an infrared (IR) sensor. In various embodiments, motion sensor 260 may be a passive infrared (PIR) sensor. UV module 200 includes a housing 202 that holds a first UV light source 204 and a second UV light source 206. Housing 202 further includes a first hole 208 through which proximity sensor 250 operates and a second hole 216 through which motion sensor 260 operates. Housing 202 may further include a power supply to power first and second UV light sources 204, 206 and additional electronics and components for operating UV module 200. Housing 202 may be made from metal, plastic, or a composite material, among others. In various embodiments, housing 202 is mounted to ceiling 114. In various embodiments, housing 202 is mounted in ceiling 114 such that a surface 210 of housing 202 is visible. Housing 202 may include fastener holes 212 to receive fasteners for mounting housing 202 to, or in, ceiling 114.

First and second UV light sources 204, 206 may emit UV light having a wavelength of about 180 nm to about 300 nm, and more specifically, from about 200 nm to about 265 nm. The wavelength of first and second UV light sources 204, 206 may determine the radiant power UV module 200. First and second UV light sources 204, 206 further include reflectors 214 for reflecting the UV light away from housing 202. Variations in reflectors 214 may further affect the radiant power of UV module 200.

Proximity sensor 250 is mounted inside housing 202 of UV module 200. Proximity sensor 250, as illustrated in FIG. 2B, includes a housing 252, an infrared (IR) emitter 254, and an IR sensor 256. Housing 252 may further include additional electronics and components for operating proximity sensor 250. Proximity sensor 250 uses IR emitter 254 and IR sensor 256 to detect the proximity, or distance, to an object (e.g., toilet 102, counter 108, floor 110, etc.). To determine the distance to the object, IR emitter 254 transmits a pulse of IR light through hole 208. The IR light hits the object and is reflected, at least partially, back through hole 208 and into IR sensor 256. Using the time-of-flight principle, proximity sensor 250 is able to measure the distance to the object.

Motion sensor 260 is mounted inside housing 202 of UV module 200. Motion sensor 260, as illustrated in FIG. 2C, includes a circuit board 262, a sensor 264, and a lens 266. In various embodiments, motion sensor 260 may further include a housing. Motion sensor 260 senses infrared energy received through lens 266 by sensor 264 to detect change in the amount of infrared energy to detect motion. In various embodiments, the change in infrared energy may be a change in lighting, a change in occupants, or movement of a door, among others. In various embodiments, lens 266 and/or sensor 264 may be modified to optimize the field of view of motion sensor 260. In various embodiments, motion sensor 260 may have an initial startup period used to identify a baseline infrared energy level that is used to detect change in the infrared energy. In various embodiments, lens 266 may extend through hole 216 of housing 202.

Figure 3:
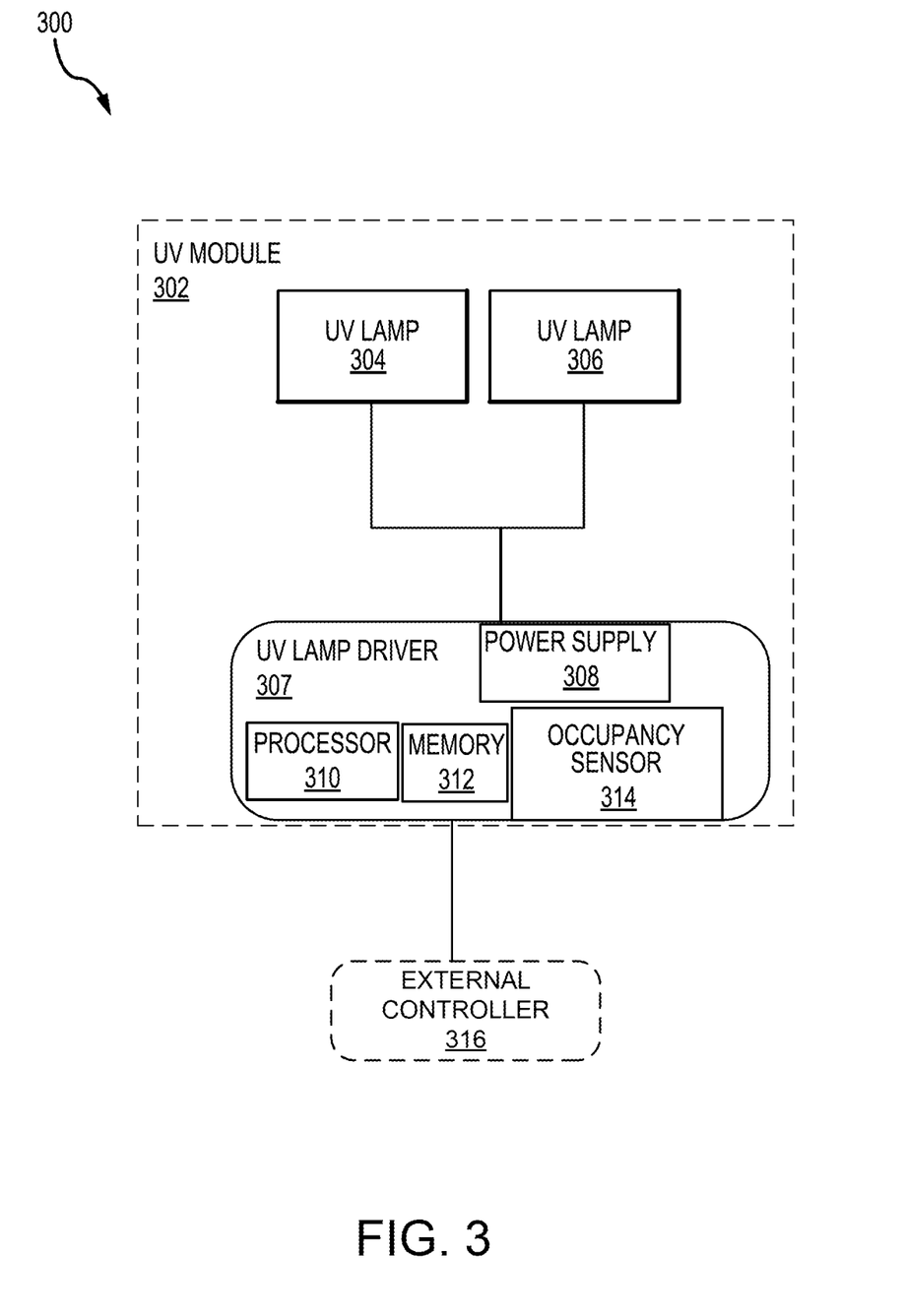
FIG. 3 illustrates a system schematic for controlling an ultraviolet lighting module, in accordance with various embodiments.

Referring now to FIG. 3, in accordance with various embodiments, a system architecture 300 for a UV module 302 is illustrated. UV module 302 may be an example of UV module 112 discussed above with respect to FIG. 1 or UV module 200 discussed above with respect to FIGS. 2A and 2B. UV module 302 includes a first UV lamp 304, a second UV lamp 306, and a UV lamp driver 307. First and second UV lamps 304, 306 may be examples of first and second UV light sources 204, 206 described above with respect to FIGS. 2A and 2B.

UV lamp driver 307 includes a power supply 308, a processor 310, a memory 312, and an occupancy sensor 314. Power supply 308 supplies the power used by first and second UV lamps 304, 306. In various embodiments, power supply 308 may be connected to an A/C power source. In various embodiments, power supply 308 may include batteries. In various embodiments, power supply 308 may be connected to the DC power supply of an aircraft.

Occupancy sensor 314 provides information about the occupancy of the area (e.g., aircraft lavatory 100) in which UV module 302 is located. In various embodiments, occupancy sensor 314 may include a combination of a proximity sensor and a motion sensor, such as for example, proximity sensor 250 and motion sensor 260 described above with respect to FIGS. 2A-2C. In various embodiments, occupancy sensor 314 may further utilize an ultrasonic sensor. In various embodiments, occupancy sensor 314 may provide a single output signal. In various embodiments, occupancy sensor 314 may provide an output signal for each sensor. For example, a first signal may provide output for the proximity sensor and a second signal may provide output from the motion sensor. In various embodiments, the signal output may be analog or digital. For example, a digital output may indicate an occupied status, either occupied or not. An analog signal may provide a continuous output of the data from the sensor.

The proximity sensor (e.g., proximity sensor 250) may provide an analog output indicating a distance to a target surface, or object. The analog signal may correlate to the distance to the target surface, or object. In various embodiments, the proximity sensor may further include an ambient light sensor. An analog output from the proximity sensor may further indicate the amount of ambient light received by the proximity sensor. The motion sensor (e.g., motion sensor 260) may provide an analog output indicating an amount of infrared energy being received by the motion sensor. The amount of infrared energy being received by the motion sensor may be affected by the presence of an occupant, movement within the area (e.g., door, person, etc.), and/or amount of light in the area, among others.

Processor 310 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. In various embodiments, processor 310 and memory 312 may be external to UV lamp driver 307, and even UV module 302, so that processor 310 and memory 312 may control more than one UV module 302.

In various embodiments, processor 310 may thus be configured to implement various logical operations in response to execution of instructions. For example, instructions may be stored on a non-transitory, tangible computer-readable medium. In various embodiments, memory 312 may be the non-transitory, tangible computer-readable medium. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Processor 310 periodically reads the output of occupancy sensor 314. In various embodiments, this may include reading output from proximity sensor 250 and motion sensor 260 separately. Processor 310 may convert the analog data received from occupancy sensor 314 to an occupancy status, either occupied or not occupied. For example, processor 310 may receive data from the proximity sensor (e.g., proximity sensor 250) and calculate the distance to the target surface, or object. Processor 310 may periodically, or continuously, read the output of the proximity sensor to determine whether the distance to the target surface, or object, changes. In various embodiments, processor 310 may measure the amount of the time over which the change in distance occurred. For example, processor 310 may identify a change in distance that occurs for less than an occupied time threshold. Such a change in distance over a short period of time may indicate a person, or object, passing through the area (e.g., aircraft lavatory 100) but that the area is not occupied because the distance changed for a brief period of time. In various embodiments, processor 310 may determine that the area is not occupied in response to the change in distance being below a distance threshold. That is, the change in distance was not significant enough (e.g., less than 5 inches) to indicate that the area is occupied and may therefore be ignored.

Processor 310 may further receive data from the motion sensor (e.g., motion sensor 260) and calculate the amount of infrared energy present in the area (e.g., aircraft lavatory 100). Processor 310 may have thresholds set to determine whether there is motion, light, and/or someone present in the area. For example, processor 310 may determine that aircraft lavatory 100 is occupied in response to the amount of infrared energy being above an occupied threshold. As another example, processor 310 may determine that aircraft lavatory 100 is not occupied in response to the infrared energy being below an unoccupied threshold. In various embodiments, the unoccupied threshold may be below the occupied threshold.

Processor 310 may further determine occupancy of the area (e.g., aircraft lavatory 100) using a combination of the proximity sensor and the motion sensor (e.g., occupancy sensor 314). As previously noted, the combination of sensors may provide a more accurate determination of whether the area is occupied. For example, the proximity sensor may be better at identifying an object staying still while the motion sensor has a larger field of view and may be better at identifying a person, or object, entering the area. Processor 310 may therefore rely on both sensors to determine whether the area is occupied.

Based on the determined occupancy status, processor 310 periodically activates UV module 302 to disinfect the area (e.g., aircraft lavatory 100). Processor 310 is triggered to activate UV module 302, and more specifically, first and second UV lamps 304, 306. Processor 310 may be triggered by a timer, a door switch, occupancy sensor 314, or a button, among others. In various embodiments, the timer may trigger processor 310 to perform a disinfecting cycle every about 5 minutes to about 30 minutes, and more specifically, about 10 minutes to about 20 minutes. In various embodiments, the door switch may trigger processor 310 to perform a disinfecting cycle in response to a passenger leaving aircraft lavatory 100 (i.e., unoccupied). In various embodiments, a crew member or maintenance person may press a button to trigger processor 310 to perform a disinfecting cycle.

Regardless of how processor 310 is triggered, processor 310 turns on UV module 302, waits for a period of time, and then turns off UV module 302. The period of time, also called cycle time, is dependent on several factors. For example, a target dose may be identified based on a desired reduction of germs on a surface, such as that described above with respect to the SARS-CoV-2 virus. As another example, the distance from the UV module 302 to the surface (e.g., toilet 102, floor 110, counter 108) affects the duration of the disinfection cycle, or in other words, how long it takes to reach the target dose. Furthermore, as previously mentioned, the wavelength of UV light used and the power output of the UV light affects the duration of the disinfection cycle. The time to reach the target dose may be decreased by increasing the strength of the UV module 302 and/or by decreasing the distance between UV module 302 and the surface.

Once triggered, processor 310 runs and manages a disinfection cycle. Each disinfection cycle begins with a processor 310 measuring the distance between UV module 302 and a target surface (e.g., toilet 102, floor 110, counter 108, etc.). In various embodiments, processor 310 may receive distance data from occupancy sensor 314. Beginning each disinfection cycle with a distance measurement allows UV module 302 to be placed in any number of locations without first calibrating UV module 302 to each location. This reduces time, energy, and expense involved in using UV module 302. Processor 310 uses the measured distance to determine the disinfection cycle time to use to reach the target dose. Processor 310 then activates first and second UV lamps 304, 306.

During each disinfection cycle, processor 310 records a distance to the target surface periodically. In various embodiments, processor 310 records the distance to the target surface every about 0.01 seconds to about 20 seconds, and more specifically, every about 1 second to about 5 seconds. Processor 310 further records the elapsed time during each disinfection cycle. The distance to the target surface is checked periodically in order to detect movement within the disinfection zone of UV module 302. Over exposure to UV light can cause problems for fixtures and humans within the disinfection zone. For example, overexposure to UV light can cause discoloration of various surfaces and degradation of the structural integrity of the surface. For humans, the problems are typically discomfort in the presence of UV module 302 as safe exposure limits for humans are generally much higher than the target dose of aircraft lavatory 100. For example, safe UV exposure limits for humans are typically about 20 mJ/cm2 to about 200 mJ/cm2.

In various embodiments, system architecture 300 may further include an external controller 316. External controller 316 may perform similar functions to processor 310. In various embodiments, external controller 316 may communicate with and control more than one UV module. In various embodiments, external controller 316 may communicate with additional occupancy sensors, such as for example, a door sensor, to further improve reliability of occupancy detection of system architecture 300, and more specifically, UV module 302.

Figure 4:
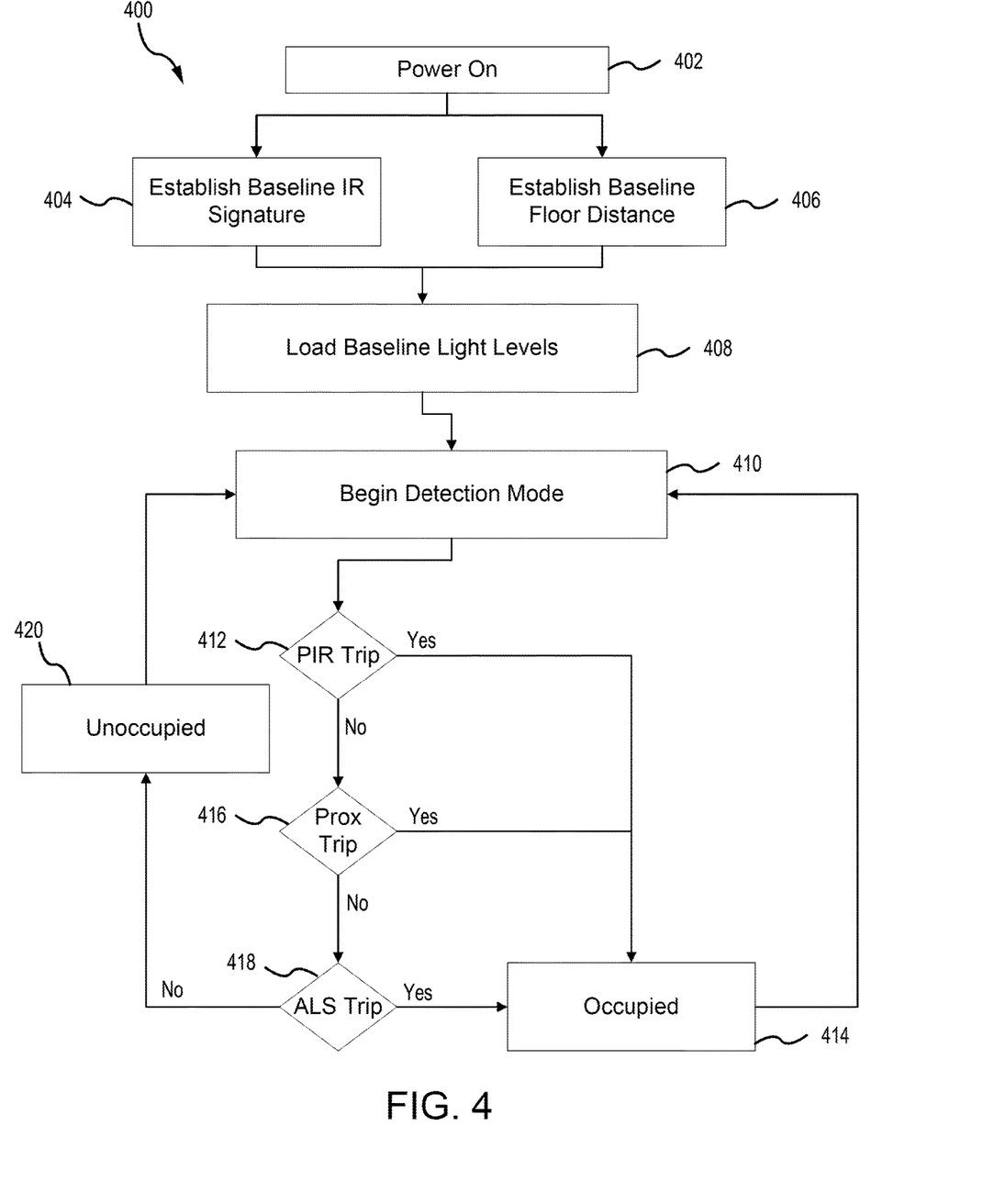
FIG. 4 illustrates a flow diagram of a method for determining occupancy by an ultraviolet lighting module, in accordance with various embodiments.

Referring now to FIG. 4, in accordance with various embodiments, a method 400 for determining occupancy by a UV module is illustrated. Method 400 may be performed by processor 310 described above with respect to FIG. 3. UV module may be UV module 112 described above with respect to FIG. 1. In various embodiments, UV module may be UV module 302 described above with respect to FIG. 3. Method 400 describes several steps in determining occupancy of an area (e.g., aircraft lavatory) which may be used prior to beginning a disinfection cycle.

At block 402, processor 310 is powered on. In various embodiments, processor 310 may be powered on in response to a switch. In various embodiments, processor 310 may be powered on in response to the aircraft powering on. In various embodiments, power on may be performed after resetting processor 310.

At block 404, processor 310 establishes a baseline infrared (IR) signature for the area in which the UV module is located. In various embodiments, the baseline IR signature may be determined based on a signal from a motion sensor (e.g., motion sensor 260). In various embodiments, the baseline IR signature may be based at least in part on the lighting in the area.

At block 406, processor 310 establishes a baseline floor distance for the area in which the UV module is located. In various embodiments, the baseline floor distance may be a distance to a surface or an object, such as for example, a counter, a toilet, or a sink, among others. In various embodiments, the baseline floor distance may be determine based on a signal from a proximity sensor (e.g., proximity sensor 250). In various embodiments, processor 310 may perform the actions of block 404 and block 406 in parallel. In various embodiments, processor 310 may perform the actions of block 404 and block 406 sequentially where either block 404 or block 406 may be performed first.

At block 408, processor 310 loads baseline light levels from memory. Processor 310 may load baseline light levels from memory 312. In various embodiments, baseline light levels may be preprogrammed. In various embodiments, processor 310 may store baseline light levels after each startup and/or during shutdown to maintain a reference level for light levels.

At block 410, processor 310 begins occupancy detection mode. In various embodiments, processor 310 may read one or more signals from an occupancy sensor (e.g., occupancy sensor 314) periodically to determine occupancy. In various embodiments, processor 310 may read one or more signals from two or more sensors, such as for example, a proximity sensor (e.g., proximity sensor 250) and a motion sensor (e.g., motion sensor 260) periodically to determine occupancy. In various embodiments, periodically may mean reading the one or more signals about every 0.5 seconds to about every 10 seconds, and more specifically, about every 1 second to about every 5 seconds.

At decision block 412, processor 310 determines whether the passive infrared (PIR) sensor (e.g., motion sensor) has been tripped. Processor 310 may determine that the motion sensor has been tripped in response to reading a signal level that exceeds a motion threshold, indicating that there is motion near the motion sensor. If it is determined that there is motion, then method 400 proceeds to block 414.

At block 414, processor 310 sets the status of the area as occupied. Setting the status of the area as occupied may prevent processor 310 from initiating a disinfection cycle of the UV module. Processor 310 may set the status to occupied in response to one or more of the sensors being tripped. Processor 310 may further perform the tasks of method 400 with one or more sensors not functioning as a single sensor may provide data from which processor 310 sets the status to occupied.

Returning to decision block 412, if instead, it is determined that there is no motion, then method 400 proceeds to decision block 416.

At decision block 416, processor 310 determines whether the proximity sensor (e.g., infrared sensor) has been tripped. Processor 310 may determine that the proximity sensor has been tripped in response to reading a distance that is less than previous distance measurements. This may indicate the presence of a person in the area (e.g., aircraft lavatory 100). If it is determined that the measured distance has decreased below a distance threshold, then method 400 proceeds to block 414. If instead, it is determined that the measured distance has not decreased below the distance threshold, then method 400 proceeds to decision block 418.

At decision block 418, processor 310 determines whether the ambient light sensor (ALS) has been tripped. In various embodiments, the proximity sensor may include an ambient light sensor. Processor 310 may determine that the ambient light sensor has tripped in response to the amount of ambient light decreasing below an occupied threshold. That is, someone present in the area is causing a decrease in ambient light. Alternatively, ambient light sensor may be tripped in response to an increase in ambient light caused by a light being turned on by an occupant. If it is determined that the ambient light sensor has been tripped, the method 400 proceeds to block 414. If, instead, it is determined that the ambient light sensor has not been tripped, the method 400 returns to block 420.

At block 420, processor 310 sets the status to unoccupied. While unoccupied, the UV module may be used to disinfect the area (e.g., aircraft lavatory 100).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of determining occupancy of an area, comprising:
    loading, by the processor, a baseline ambient light level from a memory;
    receiving, by a processor, a first signal from an occupancy sensor, wherein the first signal includes a first value indicating a first, baseline distance to a first surface and a second value indicating a first, baseline infrared signature of the area;
    receiving, by the processor, a second signal from the occupancy sensor, wherein the second signal includes a third value indicating a second distance to a second surface, a fourth value indicating a second infrared signature of the area, and a fifth value indicating a first ambient light level;
    determining, by the processor, that the area is occupied based at least in part on the second infrared signature being different than the first, baseline infrared signature;
    determining, by the processor, that the area is occupied based at least in part on the second distance being different from the first, baseline distance;
    determining, by the processor, that the area is occupied based at least in part on the first ambient light level being different than the baseline ambient light level; and
    setting, by the processor, a status of the area to occupied in response to the second distance being different from the first, baseline distance, the second infrared signature being different than the first, baseline infrared signature, and the first ambient light level being different than the baseline ambient light level.

2. The method of claim 1, wherein the second infrared signature exceeds an occupancy threshold.

3. The method of claim 1, wherein the first value and the third value are from a proximity sensor, the second value and the fourth value are from a motion sensor, and the fifth value is from an ambient light sensor.

4. A system for using an ultraviolet (UV) light, comprising:
    a UV light source;
    an occupancy sensor; and
    a UV light source driver including:
        a processor; and
        a memory coupled to the processor, the memory comprising instructions that, when executed by the processor cause the processor to:
            load a baseline ambient light level from the memory;
            receive a first signal from the occupancy sensor, wherein the first signal includes a first value indicating a first, baseline distance to a first surface and a second, value indicating a first, baseline infrared signature of the area around occupancy sensor;
            receive a second signal from the occupancy sensor, wherein the second signal includes a third value indicating a second distance to a second surface, a fourth value indicating a second infrared signature of the area, and a fifth value indicating a first ambient light level;

determine that the area is occupied based at least in part on the second infrared signature being different than the first, baseline infrared signature;

determine that the area is occupied based at least in part on the second distance being different from the first, baseline distance;

determine that the area is occupied based at least in part on the first ambient light level being different than the baseline ambient light level; and set a status of the area to occupied in response to the second distance being different from the first, baseline distance, the second infrared signature being different than the first, baseline infrared signature, and the first ambient light level being different than the baseline ambient light level.

5. The system of claim 4, wherein the occupancy sensor comprises:
a motion sensor; and
a proximity sensor.

6. The system of claim 5, wherein the occupancy sensor further includes an ambient light sensor configured to measure the first ambient light level.

7. A system for determining occupancy of an area, comprising:
a proximity sensor;
a motion sensor;
an ambient light sensor; and
a controller including:
a processor; and
a memory coupled to the processor, the memory comprising instructions that, when executed by the processor, cause the processor to:
load a baseline ambient light level from a memory;
read a first value from the proximity sensor;
read a second value from the motion sensor;
determine a first, baseline distance to a first surface based on the first value;
determine a first, baseline infrared signature of the area based on the second value;
read a third value from the proximity sensor;
read a fourth value from the motion sensor;
determine a second distance to a second surface based on the third value;
determine a second infrared signature of the area based on the fourth value;
read a fifth value from the ambient light sensor;
determine that the area is occupied based at least in part on the fourth value being different from the second value;
determine that the area is occupied based at least in part on the third value being different from the first value;
determining that the area is occupied based at least in part on the fifth value being different than the baseline ambient light level; and
set a status of the area to occupied in response to the fourth value being different from the second value, the third value being different than the first value; and the fifth value being different than the baseline ambient light level.

\* \* \* \* \*